(12) United States Patent
Hsieh et al.

(10) Patent No.: US 7,457,451 B2
(45) Date of Patent: Nov. 25, 2008

(54) SYSTEMS, METHODS AND APPARATUS FOR SPECIALIZED FILTERED BACK-PROJECTION RECONSTRUCTION FOR DIGITAL TOMOSYNTHESIS

(75) Inventors: Jiang Hsieh, Brookfield, WI (US); Stephen W. Metz, Greenfield, WI (US); Gopal B. Avinash, New Berlin, WI (US); Baojun Li, Waukesha, WI (US); John Michael Sabol, Sussex, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/950,418

(22) Filed: Dec. 4, 2007

(65) Prior Publication Data

US 2008/0107324 A1   May 8, 2008

Related U.S. Application Data

(63) Continuation of application No. 10/859,423, filed on Jun. 1, 2004, now Pat. No. 7,310,436.

(51) Int. Cl.
*G06K 9/00* (2006.01)
*G01N 23/223* (2006.01)

(52) U.S. Cl. .................... 382/131; 382/285; 378/46

(58) Field of Classification Search ............. 382/100, 382/128, 129, 130, 131–133, 154, 168, 173, 382/194, 202–203, 232, 255, 260, 285, 274–275, 382/305, 134; 378/16, 22, 21, 28, 46; 600/407
See application file for complete search history.

(56) References Cited

U.S. PATENT DOCUMENTS

| 5,803,914 | A | * | 9/1998 | Ryals et al. ............. 600/407 |
| 6,256,370 | B1 | * | 7/2001 | Yavuz ..................... 378/22 |
| 6,292,530 | B1 | * | 9/2001 | Yavus et al. ............. 378/22 |
| 7,116,749 | B2 | * | 10/2006 | Besson .................... 378/16 |
| 7,187,794 | B2 | * | 3/2007 | Liang et al. ............. 382/131 |
| 2003/0194049 | A1 | | 10/2003 | Claus et al. | |

OTHER PUBLICATIONS

Jerrold T. Bljsf-Iberg; The Essential Physics of Medical Imaging; 2 ed., 2002; pp. 351-355; Lippincott, Williams|& Wilkins; Philadelphia, PA.; ISBN 0-683-30118-7.*

Jerrold T. Bljsf-Iberg; The Essential Physics of Medical Imaging; 2 ed., 2002; pp. 351-355; Lippincott, Williams & Wilkins; Philadelphia PA.; ISBN 0-683-30118-7.

* cited by examiner

*Primary Examiner*—Seyed Azarian
(74) *Attorney, Agent, or Firm*—Peter Vogel, Esq.; William Baxter, Esq.; Michael G. Smith, Esq.

(57) ABSTRACT

Systems, methods and apparatus are provided through which in one aspect, a three-dimensional (3D) image of an object is constructed from a plurality of two-dimensional (2D) images of the object using a specialized filter. In some embodiments, the specialized filter implements a linear ramp function, a windowing function, and/or a polynomial function. In some embodiments, the 3D image is back-projected from the filtered two-dimensional images, yielding a 3D image that has improved visual distinction of overlapping anatomic structures and reduced blurring.

20 Claims, 13 Drawing Sheets

SYSTEMS, METHODS AND APPARATUS FOR SPECIALIZED FILTERED BACK-PROJECTION RECONSTRUCTION FOR DIGITAL TOMOSYNTHESIS

RELATED APPLICATION

This application claims priority under 35 U.S.C. 120 to copending U.S. application Ser. No. 10/859,423, filed Jun. 1, 2004 entitled "SYSTEMS, METHODS AND APPARATUS FOR SPECIALIZED FILTERED BACK-PROJECTION RECONSTRUCTION FOR DIGITAL TOMOSYNTHESIS."

FIELD OF THE INVENTION

This invention relates generally to digital imaging, and more particularly to reconstructing a three dimensional image using a tomosynthesis device.

BACKGROUND OF THE INVENTION

In X-ray tomosynthesis, a series of low dose X-ray images are acquired over a range of X-ray beam orientations relative to an imaged object. Digital tomosynthesis (DTS) is a limited angle imaging technique, which allows the reconstruction of tomographic planes on the basis of the information contained within the images acquired during one tomographic image acquisition. More specifically, DTS is reconstruction of three-dimensional (3D) images from two-dimensional (2D) projection images of an object.

In DTS, one back-projection technique known as "simple back-projection" or the "shift and add algorithm" is often used to reconstruct 2D images into 3D images. This technique requires a relatively straightforward implementation and minimal computational power requirements.

A reconstruction method used in tomosynthesis is known as the algebraic reconstruction technique (ART). Another reconstruction technique used in computed tomography (CT) imaging (i.e., filtered back-projection) utilizes projections over the full angular range (i.e., full 360.degree. image acquisition about the object to be imaged) and a fine angular spacing between projections. Within this framework, filtered back-projection is a reconstruction method that yields high quality reconstructions with few artifacts.

BRIEF DESCRIPTION OF THE INVENTION

The above-mentioned shortcomings, disadvantages and problems are addressed herein, which will be understood by reading and studying the following specification.

In one aspect, a method includes acquiring a plurality of two-dimensional X-ray images of an object from a tomosynthesis system, filtering the plurality of two-dimensional X-ray images of the object with a filter comprising a linear ramp function and a windowing function, and back-projecting the plurality of filtered two-dimensional X-ray images into at least one three-dimensional image of the object.

In another aspect, a system includes means for acquiring a plurality of two-dimensional X-ray images of an object from a tomosynthesis system, means for filtering the plurality of two-dimensional X-ray images of the object with a filter comprising a linear ramp function and a windowing function, and means for back-projecting the plurality of filtered two-dimensional X-ray images into at least one three-dimensional image of the object.

In yet another aspect, an apparatus operable to acquire a plurality of two-dimensional X-ray images of an object from a tomosynthesis system includes apparatus operable to filter the plurality of two-dimensional X-ray images of the object with a filter comprising a linear ramp function and a windowing function, and apparatus operable to back-project the plurality of filtered two-dimensional X-ray images into at least one three-dimensional image of the object.

Systems, clients, servers, methods, and computer-accessible media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, methods of embodiments are described. In the third section, the hardware and the operating environment in conjunction with which embodiments may be practiced are described. In the fourth section, particular implementations are described. Finally, in the fifth section, a conclusion of the detailed description is provided.

System Level Overview

Figure 1:
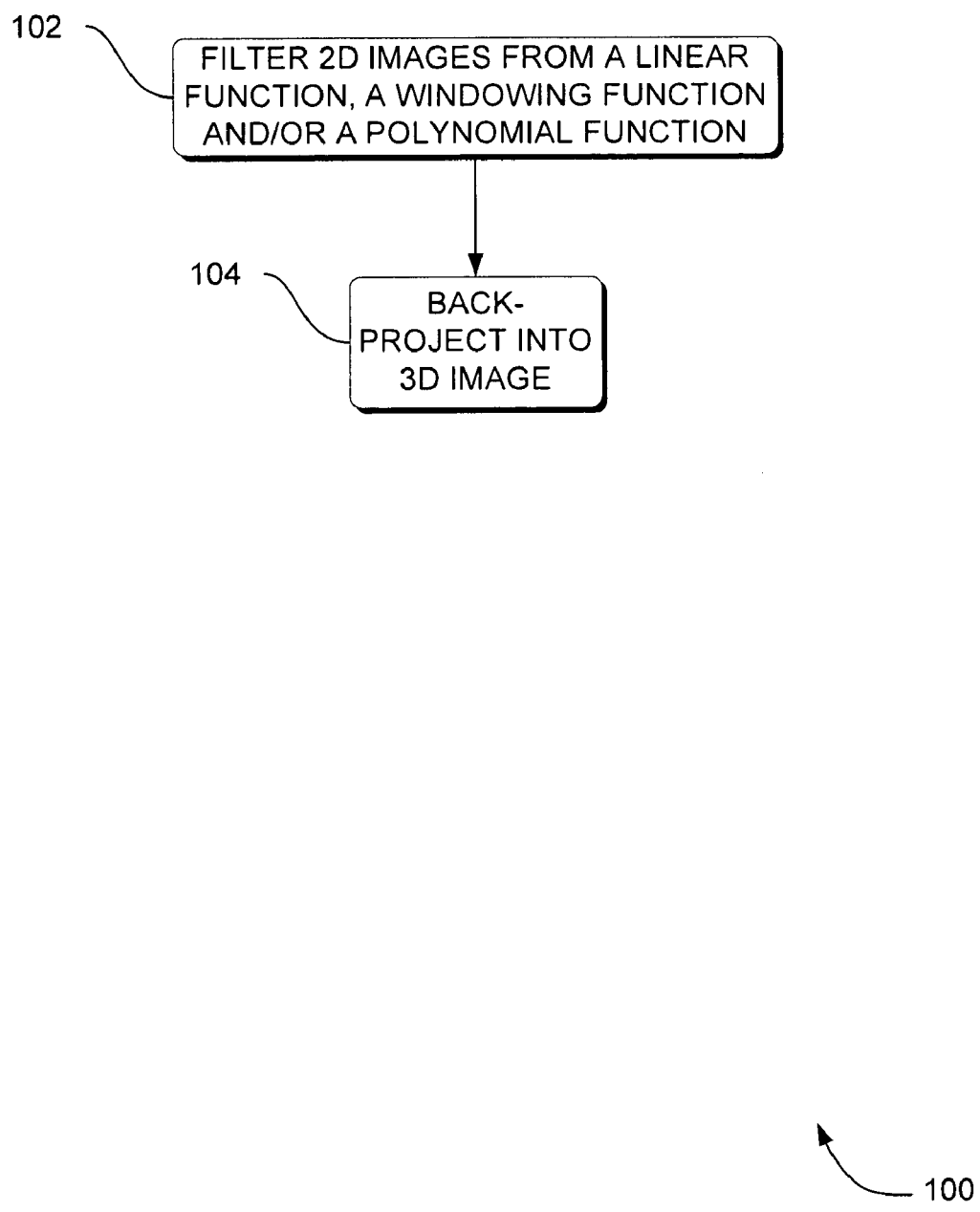
FIG. 1 is a block diagram that provides a system level overview of a method to construct a three-dimensional image of an object from a plurality to two-dimensional images of the object, using specialized filter.

FIG. 1 is a block diagram that provides a system level overview of a method to construct a three-dimensional image of an object from a plurality to two-dimensional images of the object. In method 100, projections are filtered using a specialized filter. Some embodiments operate in a multi-processing, multi-threaded operating environment on a computer, such as computer 1202 in FIG. 12.

Method 100 includes filtering 102 two or more two-dimensional images of the object. The images are filtered in the Fourier domain using a linear ramp function of the two-dimensional images, a windowing function of the two-dimensional images, and/or a polynomial function of the two-dimensional images. To combine the filtered images, the output of the linear ramp function, the windowing function, and/or the polynomial function are multiplied in the frequency domain.

The thorough and comprehensive filtering of action 102 is an improved filtering technique for two-dimensional images. In particular, filtering 102 improves visual distinction of overlapping anatomic structures in X-ray images and reduces blurring in X-ray images. Thus filtering 102 improves processing of two-dimensional images into reconstructed three-dimensional images.

Method 100 thereafter includes back-projecting 104 the filtered two-dimensional images into three-dimensional images. Filtering 102 in combination with back-projecting 104 improves processing of two-dimensional images into reconstructed three-dimensional images.

The system level overview of the operation of an embodiment has been described in this section of the detailed description. Method 100 provides improved distinction of overlapping anatomic structures in X-ray images and reduces blurring in X-ray images in 3D images that are reconstructed from 2D images. While the system 100 is not limited to any particular image or process of back-projecting, for sake of clarity a simplified image and back-projecting has been described.

Methods of an Embodiment

In the previous section, a system level overview of the operation of an embodiment was described. In this section, the particular methods performed by an imaging system, a server and/or a client of such an embodiment are described by reference to a series of flowcharts. Describing the methods by reference to a flowchart enables one skilled in the art to develop such programs, firmware, or hardware, including such instructions to carry out the methods on suitable computerized system in which the processor of the system executes the instructions from computer-accessible media. Methods 100-300 and 700-900 are performed by a program executing on, or performed by firmware or hardware that is a part of, a computer, such as computer 1202 in FIG. 12.

Figure 2:
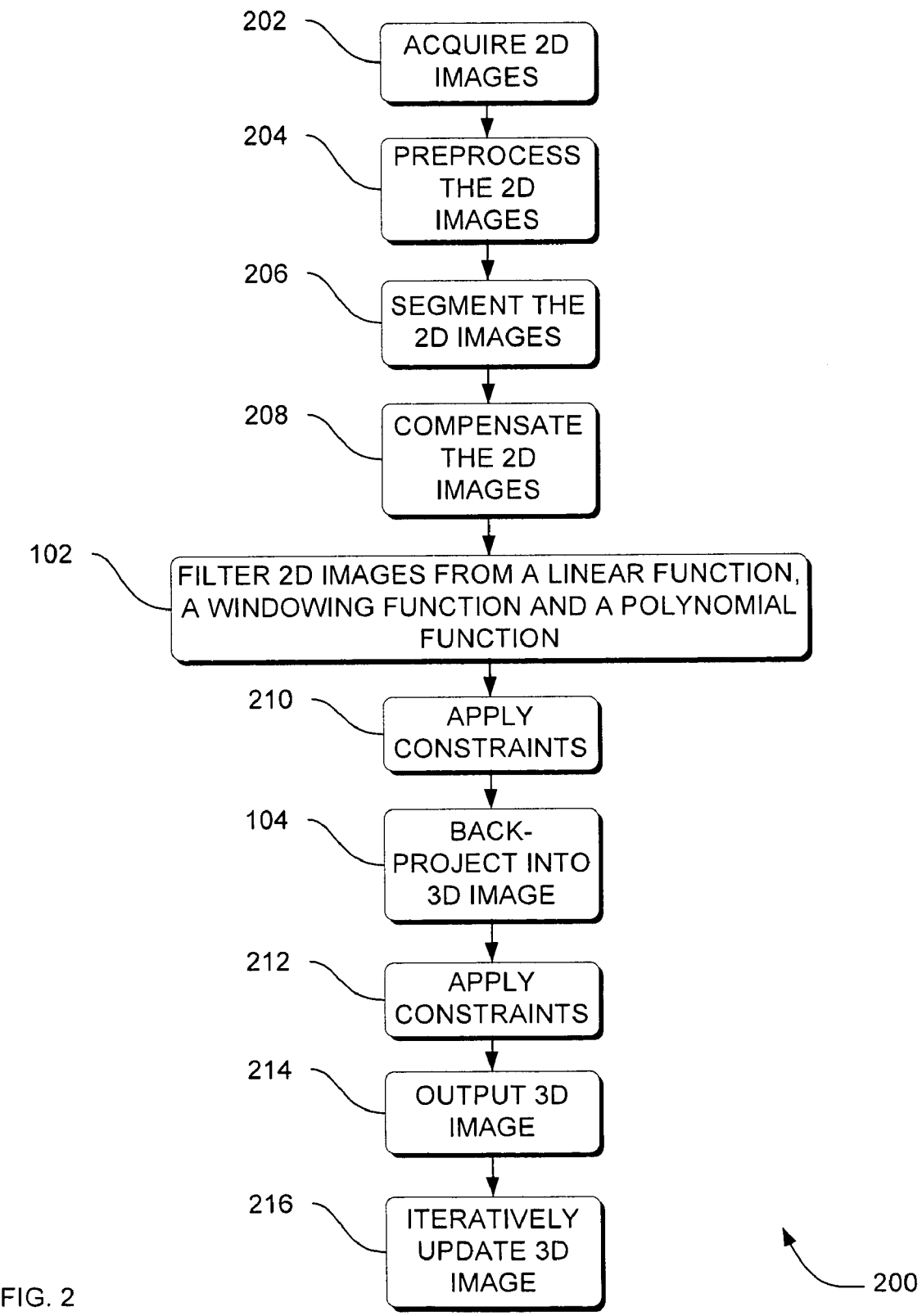
FIG. 2 is a flowchart of a method of generating a three-dimensional (3D) image from two-dimensional (2D) images using specialized filter, performed by an imaging system according to an embodiment.

FIG. 2 is a flowchart of a method 200 of generating a 3D image from 2D images using specialized filter, performed by an imaging system according to an embodiment. In method 200, a plurality of 2D views of the object is acquired 202. Image acquisition 202 can be performed, for example, using any one of a number of techniques (e.g., using a digital detector), provided the views can be made in (or converted to) digital form.

Amorphous silicon flat panel digital X-ray detectors are a common detection device for tomosynthesis imaging, but in general, any X-ray detector that provides a digital projection image can be implemented, including, but not limited to, charge-coupled device (CCD) arrays, digitized film screens, or other digital detectors, such as direct conversion detectors. Their low electronic noise and fast-read out times enable acquisitions with many projections at low overall patient dose compared to competing detector technologies.

In some embodiments, the acquired plurality of 2D views of the object are preprocessed 204 to correction the images. Preprocessing 204 may include one or more of correction for geometry effects such as distance to X-ray tube & incident angle of X-rays at detector, correction for other system effects such as gain and offset correction, bad pixel correction, correction for pathlength through the tissue, taking the negative log of the image, correction for geometry distortions (e.g. R-Square) and log transformation to restore "film-like" look, and other preprocessing aspects readily apparent to one of ordinary skill in the art. Preprocessing 204 may also include corrections for effects due to varying detector positions from view to view. Preprocessing 204 may also include special pre-processing of bad detector edge correction, 2D view weighting, and padding.

After preprocessing 204, the image value at each pixel in a view approximately represents the average linear attenuation value of the imaged object along the ray corresponding to that pixel, for an assumed underlying constant thickness.

In some embodiments, each of the plurality of 2D views of the object is segmented 206. In some embodiments, segmenting 206 comprises associating to each pixel of each 2D view, an indication of whether the pixel contains only "air" information, or tissue information. The assigning may implement techniques such as image value histogram segmentation, edge detection, contour following, etc. In some embodiments, segmenting 206 includes the use of prior shape information (e.g., using smoothness constraints of the skin line), etc. In some embodiments, each view is segmented in six into pixels corresponding to rays passing through the object and pixels corresponding to rays not passing through the object. The term "ray" refers to a given part of the X-ray beam represented by a line between the focal spot of the X-ray source and the considered pixel. The segmenting 206 can also provide a boundary curve (i.e., a curve separating the pixels corresponding to rays passing through the object from the 1 pixels corresponding to rays not passing through the object), which can be used in the thickness compensation 208. Other segmenting techniques may also be used, as would be readily apparent to one of ordinary skill in the art after reading this disclosure.

By segmenting 206, pixels not containing useful information (i.e., pixels corresponding to rays not passing through the object) can be given a constant image value, in some embodiments, about equal to an average image value for pixels corresponding to rays passing through the object. This enhances the appearance of structures (including abnormalities) within the reconstructed 3D image of the object, and reduces artifacts. Thus, the overall performance of the reconstruction can be greatly improved. As will be described in detail below, segmenting 206 the 2D views is a particularly effective technique when used in combination with the thickness compensation step 208.

Method 200 also includes compensating 208 the segmented 2D views of the object for a thickness of the image object. Conventional thickness compensation techniques can be used in the segmenting 208. Compensating 208 for thickness provides a significant reduction of reconstruction artifacts due to the reduced thickness of the imaged object near the boundary and preserves coarse scale in the image corresponding to variations in tissue characteristics that are not due to the reduced thickness.

Compensating 208 for thickness allows for a "fair comparison" of different image values in the back-projected 2D views, in that back-projecting 104 in some embodiments uses an order statistics operator, and therefore compares different image values from different projection images. A bias in one or more values which is due to a reduced thickness at the corresponding location can have a counterproductive effect on the resulting reconstructed 3D image. This effect can be minimized by compensating 208 for thickness. Thus, compensating 208 for thickness provides substantial improvements over conventional techniques.

The plurality of 2D views are filtered 102. Filtering 102 can preferably be implemented as a one-dimensional (1D) or a 2D filtering process. In 1D filtering, appropriate filters are mapped from CT geometry to a tomosynthesis geometry. One example of CT geometry is 360 degree acquisition, in which the detector rotates opposite of the tube such that the incoming X-rays are substantially perpendicular to the detector surface for all views. One example of tomosynthesis geometry is less than 360 degree acquisition, and the angle of the incoming X-rays on the detector varies from view to view. In some embodiments, the mapped filter would be shift-variant, but the effect on the image quality of the reconstructed volume is generally negligible. Mapped versions of conventional filters, as well as other 1D filters which are optimized with respect to some reconstruction image quality criterion can be implemented. Filters for each view can be used in accordance with specific acquisition geometry. The 2D filter can be generated from the one-dimensional filter by either swirl it 360 degrees ("circular"), or multiplying itself by its transposed version ("rectangular").

In some embodiments of method 200, constraints are applied 210 to the filtered 2D views. In more specific embodiments of applying 210 constraints, only "physically admissible" image values are retained for further analysis. For example, negative values (which do not correspond to physical reality) may be set to zero, or the maximum attenuation of the material of the imaged object may be known, which would allow one to derive a maximum meaningful value, and the image could thus be truncated to that maximum meaningful value. As only physically admissible image values are retained, constraint application improves the noise and artifact characteristics of the reconstruction method.

The filtered plurality of 2D views of the object are then back-projected 104 into a 3D representation of the object. In some embodiments the back-projecting 104 uses an order statistics-based back-projecting technique.

Order statistics-based back-projection is significantly different in many aspects to simple back-projection reconstruction. Specifically, in order statistics based back-projecting, the averaging operator which is used to combine individual back-projected image values at any given location in the reconstructed volume is replaced by an order statistics operator. Thus, instead of simply averaging the back-projected pixel image values at each considered point in the reconstructed volume, an order statistics based operator is applied on a voxel-by-voxel basis.

Depending on the specific framework, different order statistics operators may be used (e.g., minimum, maximum, median, etc.), but in some embodiments, an operator which averages all values with the exception of some maximum and some minimum values is preferred. More generally, an operator which computes a weighted average of the sorted values can be used, where the weights depend on the ranking of the back-projected image values. In particular, the weights corresponding to some maximum and some minimum values may be set to zero. By using the aforementioned operator for breast imaging, streak artifacts (which are generally caused either by high contrast structures—maxima, or by the "overshoot" caused by the filtering of some high contrast structure—minima) are minimized, while some of the noise reduction properties of the linear averaging operator are retained.

Alternatively, other back-projection methods may also be used in action 104, such as Shift & Add, Generalized Filtered Back-Projection. Other methods may also be included, based on a minimum-norm solution such as ART, DART, MITS, TACT, Fourier-Based Reconstruction, Objective Function-Based Reconstruction, or combinations thereof.

Back-projecting 104 is further improved by back-projecting data already segmented in action 206. For example, the segmentation result can be used to set a reconstructed value to zero (or some other appropriate value) if at least a single back-projected image value indicates an "outside" location (i.e., the corresponding pixel in that view was determined not to correspond to a ray passing through the imaged object). In addition, if some voxel in the reconstruction volume is not contained in all projection radiographs (e.g., because for some projection angle the corresponding point was not projected onto the active area of the detector), then only the projection radiographs that contain this voxel are taken into account in the reconstruction. In an alternate approach, one can artificially increase the image size by adding regions to the boundaries of the image and setting the image values in these regions equal to the "background value." Both of these approaches help to minimize artifacts which are due, for example, to the boundary effects of the detector.

In some embodiments, method 200 includes applying 212 constraints to the reconstructed dataset/3D image after the back-projecting 104. Applying constraints 212 may include setting negative values to zero, truncating high values to the maximum value for the type of object imaged, etc. Apply 212 constraints may also include post-processing functions such as image/contrast enhancement of tissue equalization, thickness compensation, and/or brightness/white balancing. This may be particularly useful in combination with iterative update step 216 described in detail below.

Thereafter, the reconstructed 3D image of the object is output 214, such as by displaying the image.

In some embodiments, the reconstructed 3D representation of the object is iteratively updated 216. In various embodiments, iteratively updating 216 includes re-projecting the reconstructed 3D image of the object, comparing the reconstructed 3D image to the acquired views, and updating the reconstructed 3D image of the object. In some embodiments, iteratively updating 216 is performed prior to outputting 214 the reconstructed 3D image of the object. In some embodiments, iteratively updating 216 is performed at intervals followed by an updated outputted 3D image.

Figure 3:
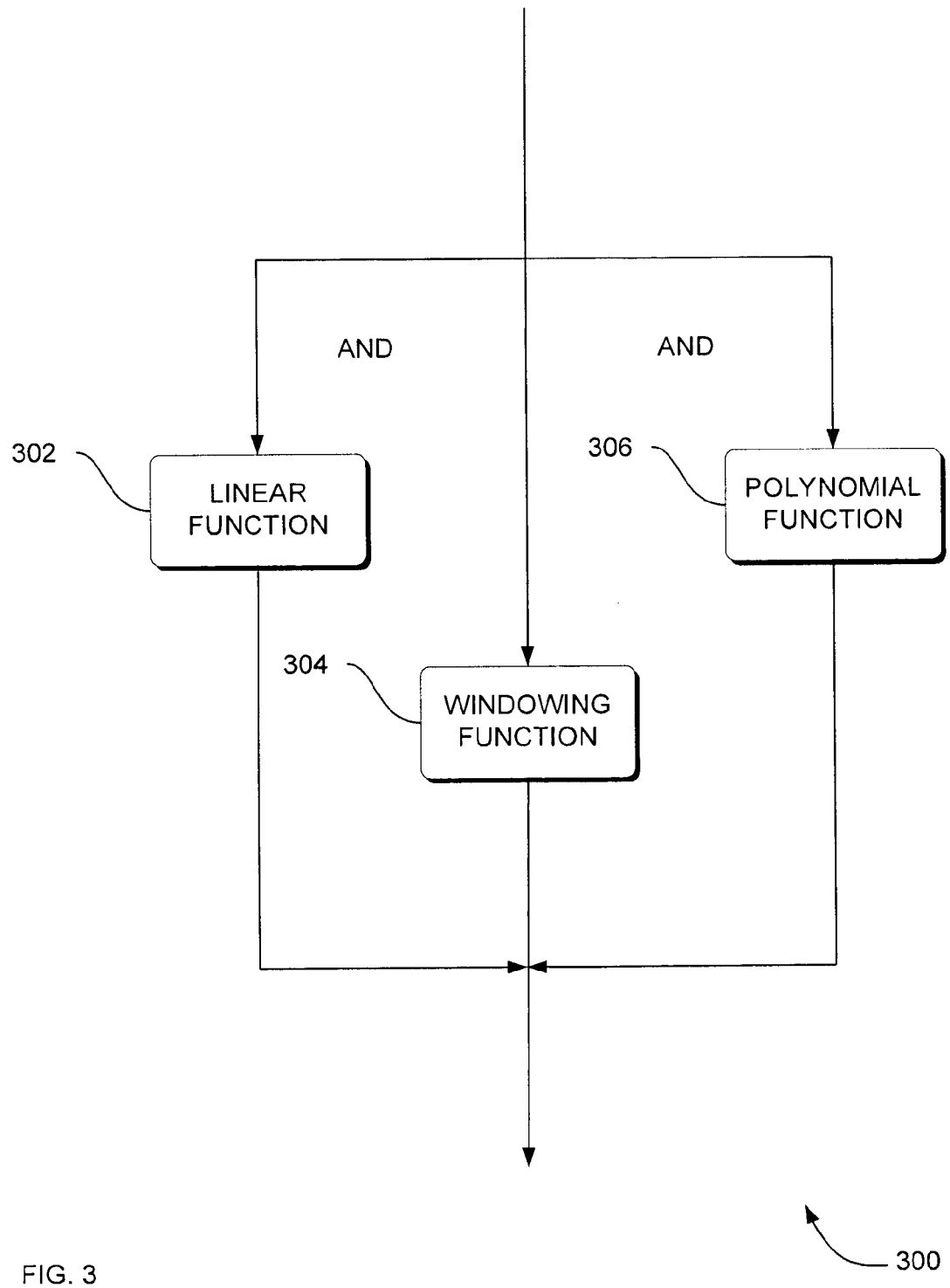
FIG. 3 is a flowchart of a filtering method of a specialized filter performed by an imaging system according to an embodiment.

FIG. 3 is a flowchart of a filtering method 300 of a specialized filter performed by an imaging system according to an embodiment. Method 300 is one embodiment of filtering 102 in FIG. 1.

In method 300, a linear function 302, a windowing function 304 and a polynomial function are performed on the 2D images. The combination of the three filtering actions 302, 304, and 306 provides a thorough and comprehensive filtering that improves distinction of overlapping anatomic structures and reduces blurring in 3D images that are reconstructed from 2D images that have been filtered in accordance with method 300.

The linear function 302 provides high-pass filtering that deemphasizes high frequencies in which the gain is proportionate to the frequency. In some embodiments, the linear function is a starter kernel function. In some embodiments, the linear function is a Ramachandran-Lakshminarayanan (Ram-Lak) filter or a Shepp-Logan filter. A Ram-Lak filter is also known as a ramp function. The Ram-Lak filter function shown in Formula 1 below:

$$H(\xi)=|\xi|rect(\xi/(2\xi_{max}))$$

Formula 1

In Formula 1, $\xi$ is frequency. Frequency components greater than $\xi_{max}$ are truncated. A conventional example of a filter that reduces noise by suppressing the gain in high frequencies is the Shepp-Logan filter, shown in Formula 2 below:

$$H(\xi)=|\xi|sinc(\xi/(2\xi_{max}))rect(\xi(2\xi_{max}))$$

Formula 2

The Shepp-Logan filter shown in Formula 2 is a modified version of the Ram-Lak filter. The Shepp-Logan filter multiplies the Ram-Lak filter by the sinc function, which is the equivalent of the convolution with the rect function in the real domain, which has the effect of average filtering in the real domain.

The windowing function 304 can be a Hanning function or any other bell-shaped Gaussian function that ramps down smoothly.

Figure 4:
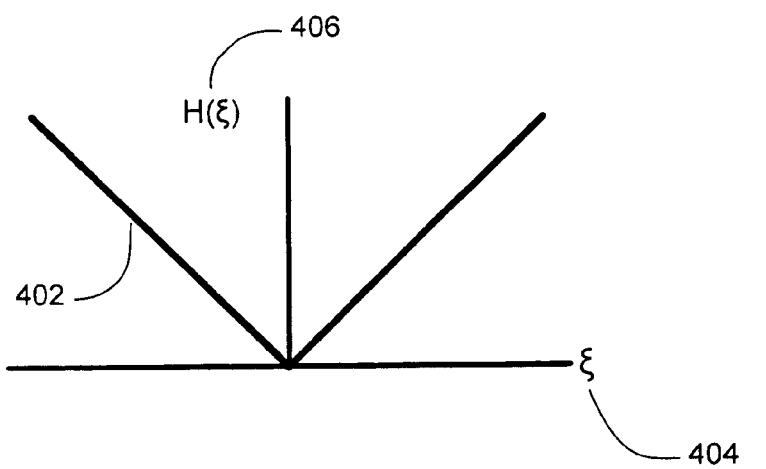
FIG. 4 is a diagram of an unfiltered signal of an image, according to an embodiment.

FIG. 4 is a diagram 400 of an unfiltered signal 402 of an image, according to an embodiment. The diagram shows the unfiltered signal 402 having a frequency $\xi$ 404 plotted along an amplitude of H($\xi$) 406.

Figure 5:
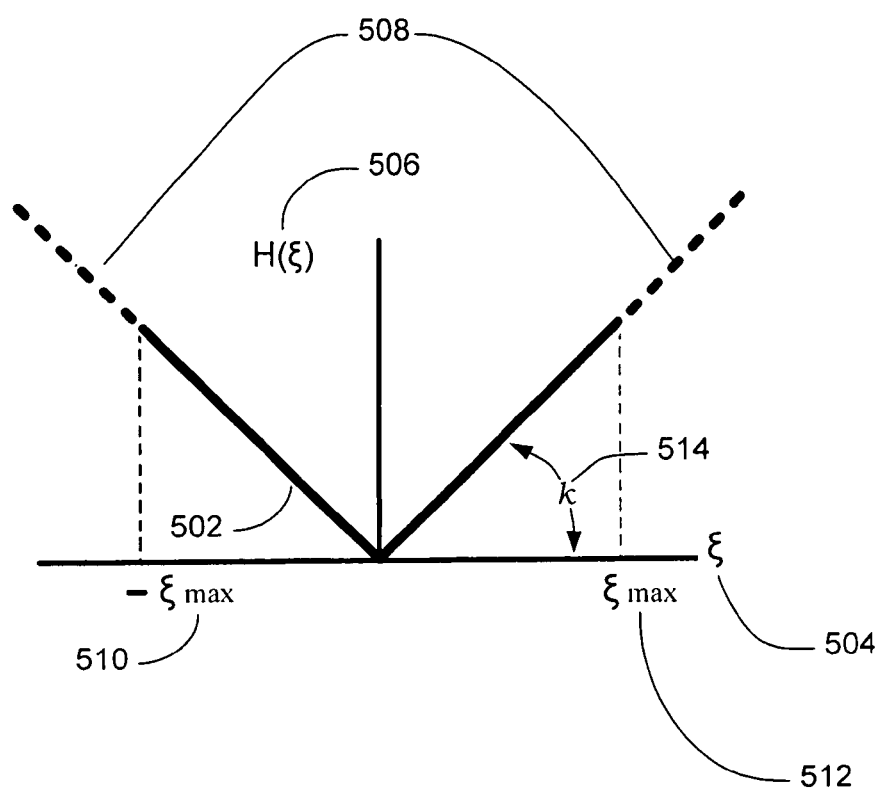
FIG. 5 is a diagram of a Ram-Lak filtered signal of an image, according to an embodiment.

FIG. 5 is a diagram 500 of a Ram-Lak filtered signal 504 of an image, according to an embodiment. The diagram shows the signal 502 that is filtered by a Ram-Lak filter in accordance with Formula 1 having a frequency $\xi$ 504 plotted along an amplitude of H($\xi$) 506. The portion 508 of the signal 504 that is outside the bounds $-\xi_{max}$ 510 and $\xi_{max}$ 512 is truncated.

Figure 6:
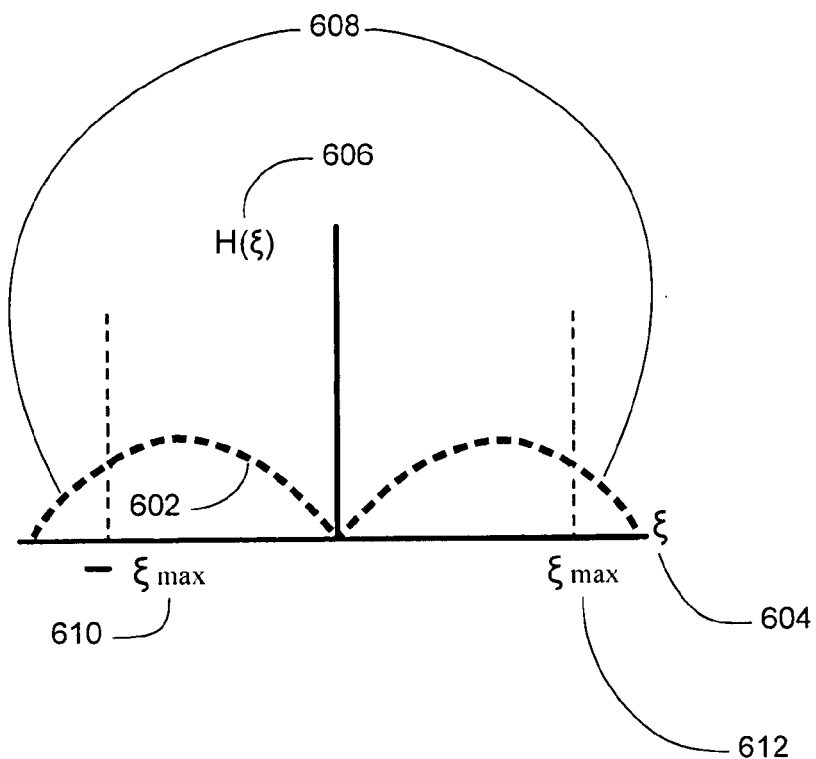
FIG. 6 is a diagram of a Shepp-Logan filtered signal of an image, according to an embodiment.

FIG. 6 is a diagram 600 of a Shepp-Logan filtered signal 602 of an image, according to an embodiment. The diagram shows the signal 602 that is filtered by a Shepp-Logan filter in accordance with Formula 2 having a frequency $\xi$ 604 plotted along an amplitude of H($\xi$) 606. The portion 608 of the signal 602 that is outside the bounds $-\xi_{max}$ 610 and $\xi_{max}$ 612 is truncated. The slope k 514 is optimized and balanced to improve contrast and minimize image noise.

Figure 7:
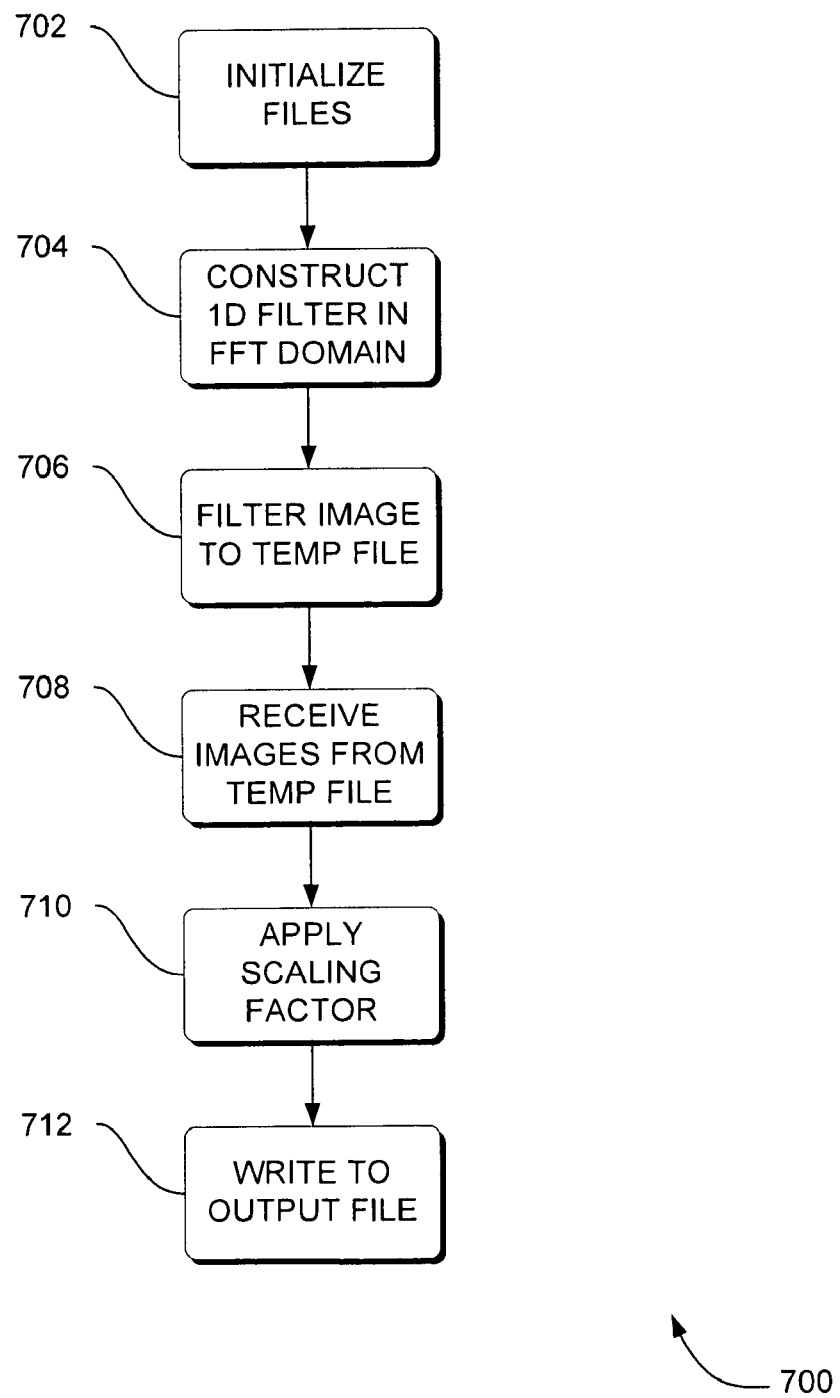
FIG. 7 is a flowchart of a method to construct a filter by invoking a Ram-Lak filter performed by an imaging system according to an embodiment.

FIG. 7 is a flowchart of a method 700 to construct a filter by invoking a Ram-Lak filter performed by an imaging system according to an embodiment. Method 700 is one embodiment of a liner filtering function 302 in FIG. 3.

Method 700 includes initializing 702 input and output files. In some embodiments, that includes creating an output filename, opening and input image file for reading, opening the output file for writing, reading in a header, obtaining the number of images and image size from the header, and writing the header to the output file.

Figure 8:
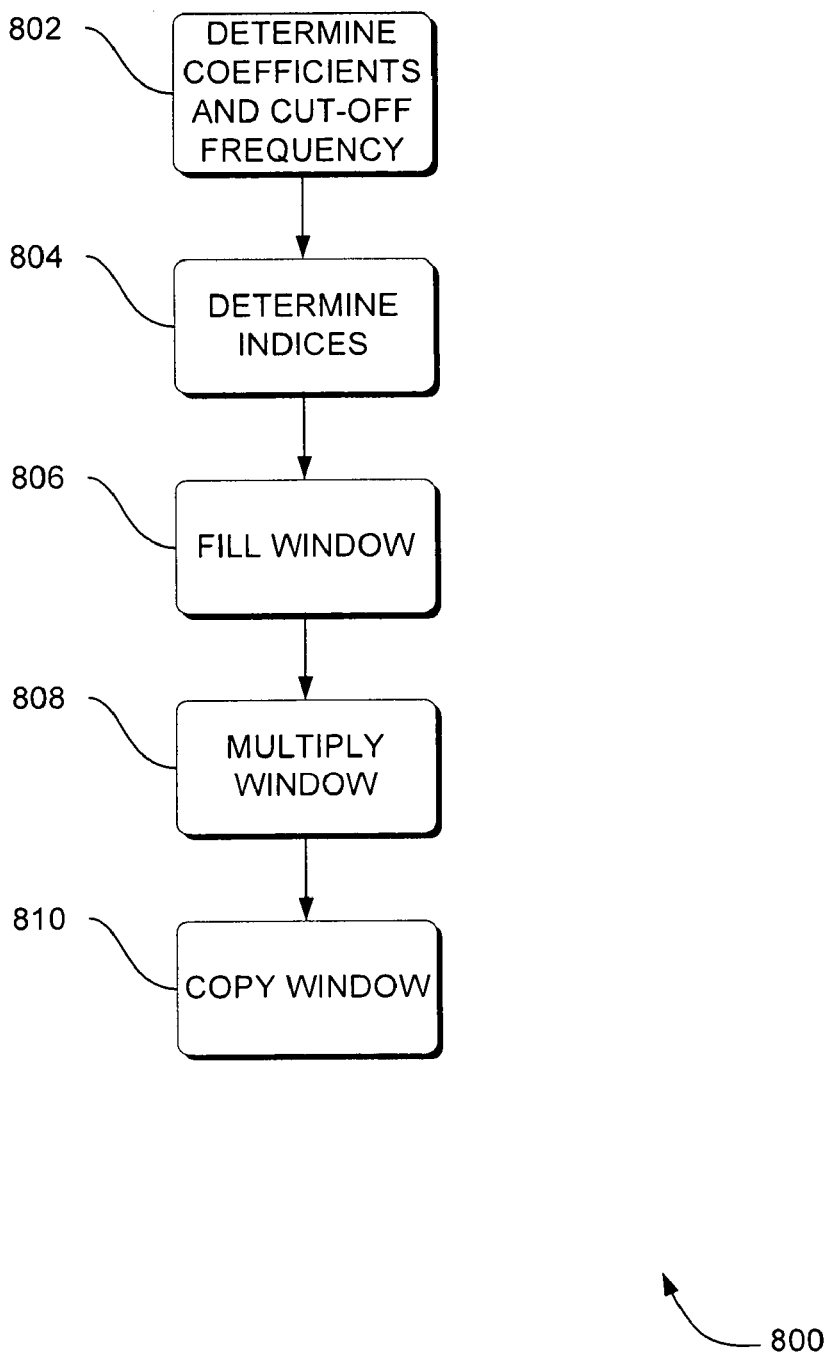
FIG. 8 is a flowchart of a method of constructing a one-dimensional (1D) Ram-Lak filter performed by an imaging system according to an embodiment.

After initialization, a 1D filter is constructed 704 in the fast-Fourier transform (FFT) domain, such as by invoking Ram-Lak 1D filter constructor method 800 in FIG. 8. In other embodiments, other filters are constructed. The 1D filter implements a data structure that represents a vector having 4096 elements. The size of 4096 elements is determined using the Nyquist criteria. In 1927, Mr. Nyquist of Bell Labs determined that an analog signal should be sampled at least twice the frequency of its highest-frequency component in order to be converted into an adequate representation of the signal in digital form. This rule is now known as the Nyquist-Shannon sampling theorem. In digital tomosynthesis, a detector will generate a digital representation of an image using 2022 elements. Using a Nyquist criteria of a multiple of 2, a minimum of 4044 elements is required to adequately represent the image. The number of 4044 elements is under up to 4096 in order to be readily addressed in binary addressing that is used by computers.

Thereafter, the image is filtered 706 to a temporary file having 4096 elements using the constructed Ram-Lak 1D filter from action 704. One example of the filtering 706 is method 900 in FIG. 9.

Subsequently, method 700 includes receiving 708 images from the temporary file and applying 710 a scaling factor to the temporary file. The temporary file is then written 712 to the output file.

FIG. 8 is a flowchart of a method 800 of constructing a 1D Ram-Lak filter performed by an imaging system according to an embodiment. Method 800 is one embodiment of action 704 in FIG. 7.

Method 800 includes determining 802 a polynomial tweaking window coefficients and a cut-off frequency. Method 800 also includes determining 804 a start-array index and an end-array index for windowing ramp function. Method 800 also includes filling 806 a basic window with binary '1''s up to and including an element following the start-array index. Method 800 subsequently includes multiplying 808 a polynomial window. Thereafter, method 800 includes copying 810 the left half window to the right half of the window.

Figure 9:
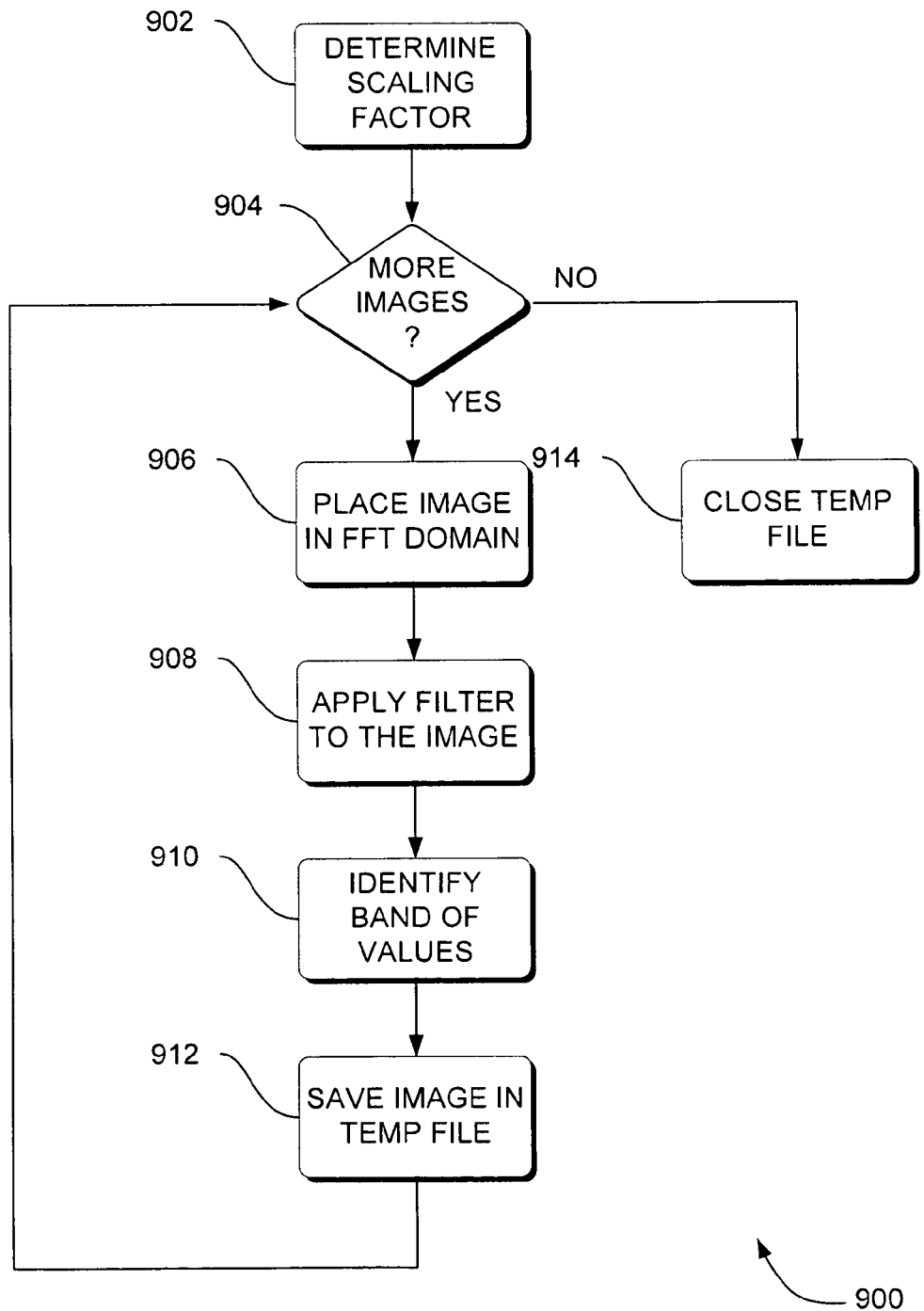
FIG. 9 is a flowchart of a method of filtering an image to a temporary file using a Ram-Lak 1D filter.

FIG. 9 is a flowchart of a method 900 of filtering 706 an image to a temporary file using a Ram-Lak 1D filter. Method 900 is one embodiment of filtering 706 in FIG. 7.

Method 900 includes determining 902 a correct filter scaling factor. Then a determination 904 is made as to whether or not additional images are to be processed.

If more images are to be processed, then the next image is placed 906 in the FFT domain. Then a filter is applied 908 to that image, and a band of values of the image are identified 910. The image is saved 912 in a temporary file.

When no more images are to be processed, the temporary file is closed 914.

Figure 10:
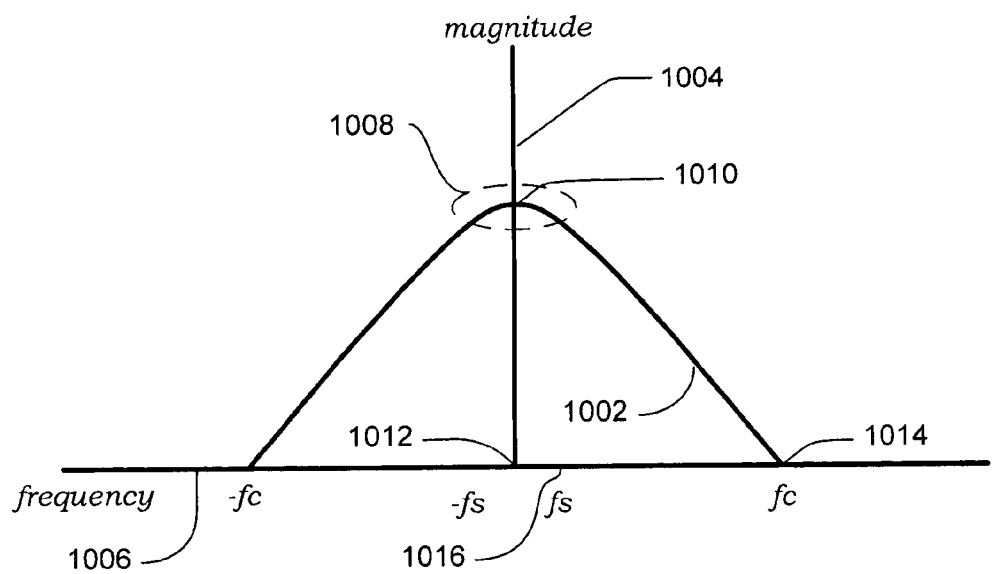
FIG. 10 is a diagram of a windowing filtered signal of an image, according to an embodiment.
Figure 10:
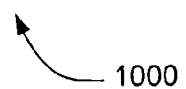

FIG. 10 is a diagram 1000 of a windowing filtered signal 1002 of an image, according to an embodiment. Diagram 1000 shows the signal 1002 that is filtered by a windowing function filter in accordance with action 304 in FIG. 3 plotted along a magnitude 1004 and a frequency 1006. The windowing function is a continuous function that has a plateau segment 1008 before it starts to ramp down smoothly from a maximum magnitude of 1.0 1010 to a magnitude of 0.0 (zero) 1012 at a cutoff frequency (fc) 1014. In other embodiments, the function starts at a magnitude 1004 value of other than 1.0 and does not have a plateau segment before it starts to ramp down. A starting frequency (fs) 1016 identifies the beginning of the plateau segment. In some embodiments, the cutoff frequency (fc) 1014 and the starting frequency (fs) 1016 are optimized to preserve image details and produce minimal image noises.

Figure 11:
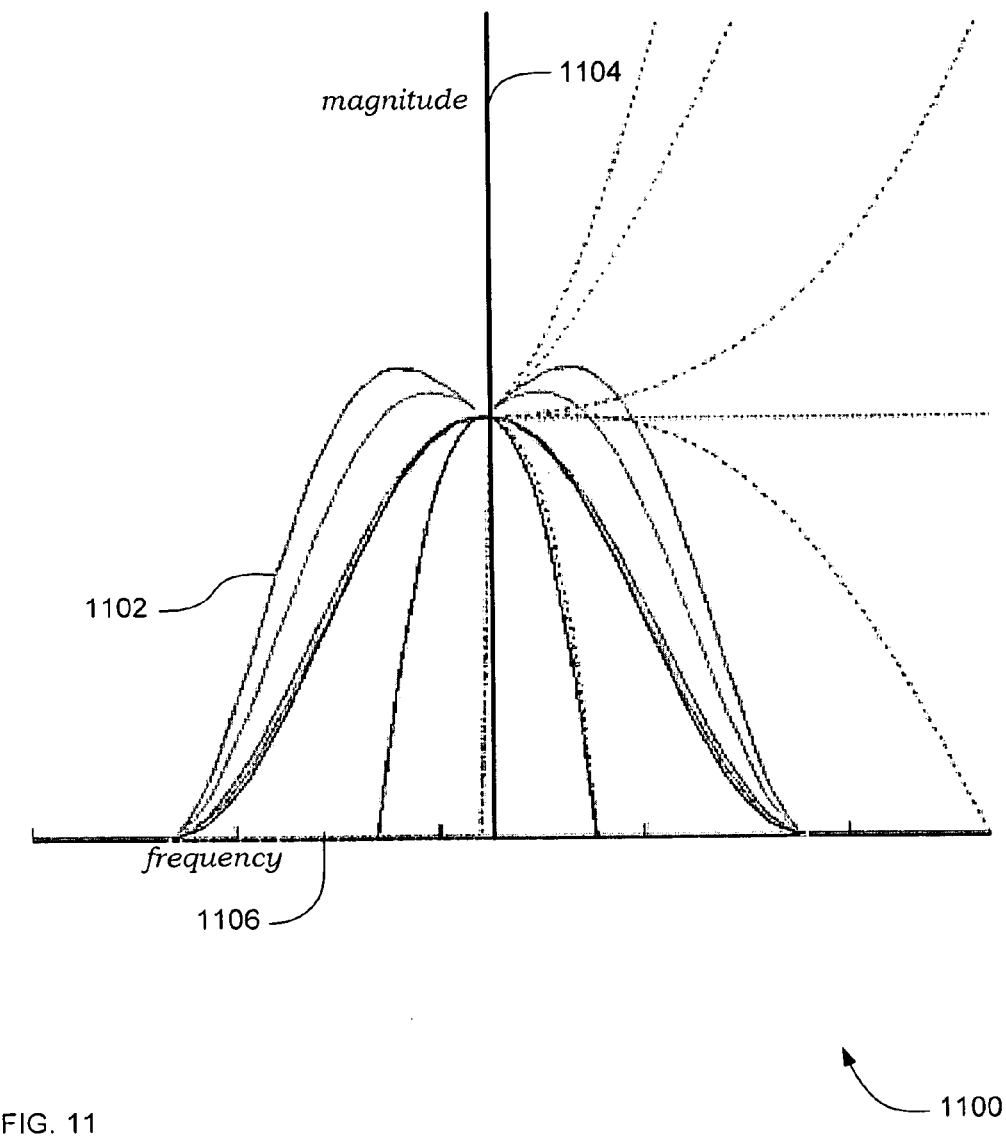
FIG. 11 is a diagram of a polynomial function applied to an image, according to an embodiment.

FIG. 11 is a diagram 1100 of a polynomial function 1002 applied to an image, according to an embodiment. Diagram 1100 shows the polynomial function 1102 in accordance with action 306 in FIG. 3 plotted along a magnitude 1104 and a frequency 1106. The polynomial function 1100 fine tunes the frequency response of the specialized filter to enhance certain frequencies and to suppress others. The polynomial function is typically a continuous function of second-order (not shown) or higher-order polynomials, such as the $4^{th}$-order polynomial shown in diagram 1100. An example of a fourth-order polynomials is shown in Formula 3 below:

$$F(w)=c4w^4+c3w^3+c2w^2+c1w+c_0$$

Formula 3

The fourth-order polynomial of Formula 3 is shown in dotted-lines in FIG. 11, and the product of the polynomial functions and a windowing function are also shown in solid-lines. Another term for a polynomial function includes a piece-wise spline function. Applying a polynomial function helps to differentiate the particular anatomies/structure in the image.

Figure 12:
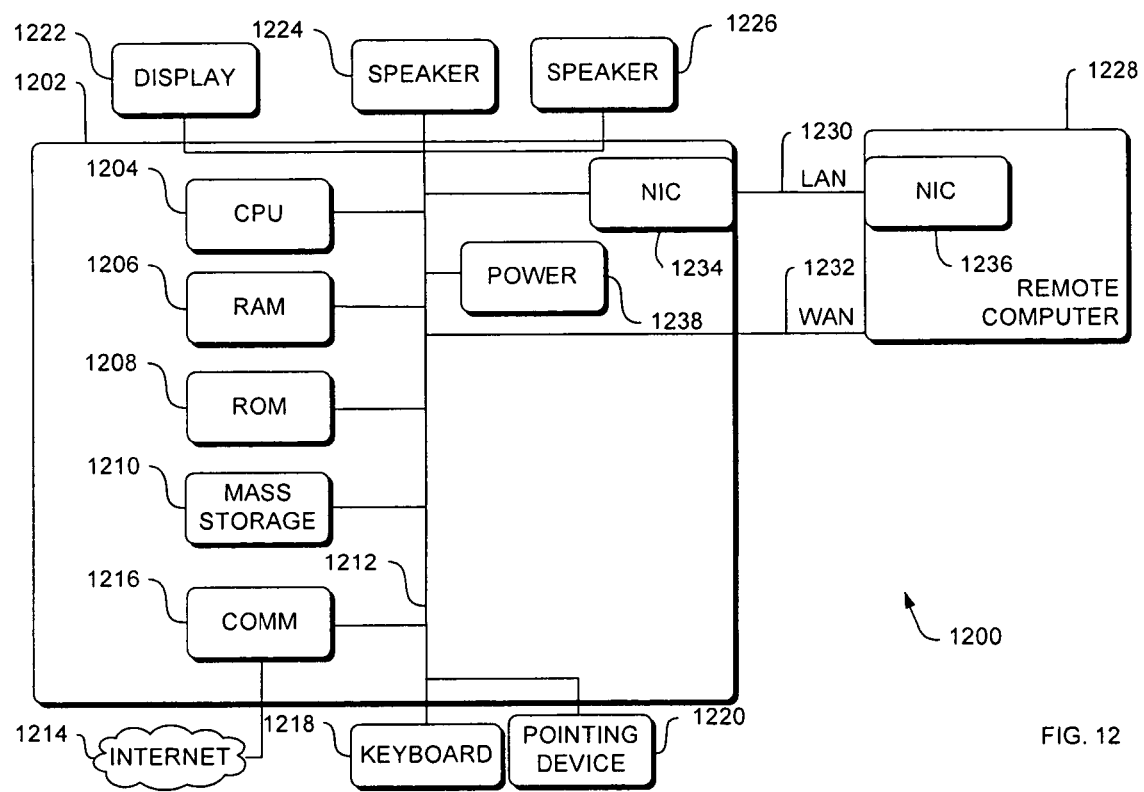
FIG. 12 is a block diagram of the hardware and operating environment in which different embodiments can be practiced.

In some embodiments, methods 100-300 and 700-900 are implemented as a computer data signal embodied in a carrier wave, that represents a sequence of instructions which, when executed by a processor, such as processor 1204 in FIG. 12, cause the processor to perform the respective method. In other embodiments, methods 100-300 and 700-900 are implemented as a computer-accessible medium having executable instructions capable of directing a processor, such as processor 1204 in FIG. 12, to perform the respective method. In varying embodiments, the medium is a magnetic medium, an electronic medium, or an optical medium.

Hardware and Operating Environment

FIG. 12 is a block diagram of the hardware and operating environment 1200 in which different embodiments can be practiced. The description of FIG. 12 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 1202 includes a processor 1204, commercially available from Intel, Motorola, Cyrix and others. Computer 1202 also includes random-access memory (RAM) 1206, read-only memory (ROM) 1208, and one or more mass storage devices 1210, and a system bus 1212, that operatively couples various system components to the processing unit 1204. The memory 1206, 1208, and mass storage devices, 1210, are types of computer-accessible media. Mass storage devices 1210 are more specifically types of nonvolatile computer-accessible media and can include one or more hard disk drives, floppy disk drives, optical disk drives, and tape cartridge drives. The processor 1204 executes computer programs stored on the computer-accessible media.

Computer 1202 can be communicatively connected to the Internet 1214 via a communication device 1216. Internet 1214 connectivity is well known within the art. In one embodiment, a communication device 1216 is a modem that responds to communication drivers to connect to the Internet via what is known in the art as a "dial-up connection." In another embodiment, a communication device 1216 is an Ethernet® or similar hardware network card connected to a local-area network (LAN) that itself is connected to the Internet via what is known in the art as a "direct connection" (e.g., T1 line, etc.).

A user enters commands and information into the computer 1202 through input devices such as a keyboard 1218 or a pointing device 1220. The keyboard 1218 permits entry of textual information into computer 1202, as known within the art, and embodiments are not limited to any particular type of keyboard. Pointing device 1220 permits the control of the screen pointer provided by a graphical user interface (GUI) of operating systems such as versions of Microsoft Windows®. Embodiments are not limited to any particular pointing device 1220. Such pointing devices include mice, touch pads, trackballs, remote controls and point sticks. Other input devices (not shown) can include a microphone, joystick, game pad, satellite dish, scanner, or the like.

In some embodiments, computer 1202 is operatively coupled to a display device 1222. Display device 1222 is connected to the system bus 1212. Display device 1222 permits the display of information, including computer, video and other information, for viewing by a user of the computer. Embodiments are not limited to any particular display device 1222. Such display devices include cathode ray tube (CRT) displays (monitors), as well as flat panel displays such as liquid crystal displays (LCD's). In addition to a monitor, computers typically include other peripheral input/output devices such as printers (not shown). Speakers 1224 and 1226 provide audio output of signals. Speakers 1224 and 1226 are also connected to the system bus 1212.

Computer 1202 also includes an operating system (not shown) that is stored on the computer-accessible media RAM 1206, ROM 1208, and mass storage device 1210, and is and executed by the processor 1204. Examples of operating systems include Microsoft Windows®, Apple MacOS®, Linux®, UNIX®. Examples are not limited to any particular operating system, however, and the construction and use of such operating systems are well known within the art.

Embodiments of computer 1202 are not limited to any type of computer 1202. In varying embodiments, computer 1202 comprises a PC-compatible computer, a MacOS®-compatible computer, a Linux®-compatible computer, or a UNIX®-compatible computer. The construction and operation of such computers are well known within the art.

Computer 1202 can be operated using at least one operating system to provide a graphical user interface (GUI) including a user-controllable pointer. Computer 1202 can have at least one web browser application program executing within at least one operating system, to permit users of computer 1202 to access intranet or Internet world-wide-web pages as addressed by Universal Resource Locator (URL) addresses. Examples of browser application programs include Netscape Navigator® and Microsoft Internet Explorer®.

The computer 1202 can operate in a networked environment using logical connections to one or more remote computers, such as remote computer 1228. These logical connections are achieved by a communication device coupled to, or a part of, the computer 1202. Embodiments are not limited to a particular type of communications device. The remote computer 1228 can be another computer, a server, a router, a network PC, a client, a peer device or other common network node. The logical connections depicted in FIG. 12 include a local-area network (LAN) 1230 and a wide-area network (WAN) 1232. Such networking environments are commonplace in offices, enterprise-wide computer networks, intranets and the Internet.

When used in a LAN-networking environment, the computer 1202 and remote computer 1228 are connected to the local network 1230 through network interfaces or adapters 1234, which is one type of communications device 1216. Remote computer 1228 also includes a network device 1236. When used in a conventional WAN-networking environment, the computer 1202 and remote computer 1228 communicate with a WAN 1232 through modems (not shown). The modem, which can be internal or external, is connected to the system bus 1212. In a networked environment, program modules depicted relative to the computer 1202, or portions thereof, can be stored in the remote computer 1228.

Computer 1202 also includes power supply 1238. Each power supply can be a battery.

Figure 13:
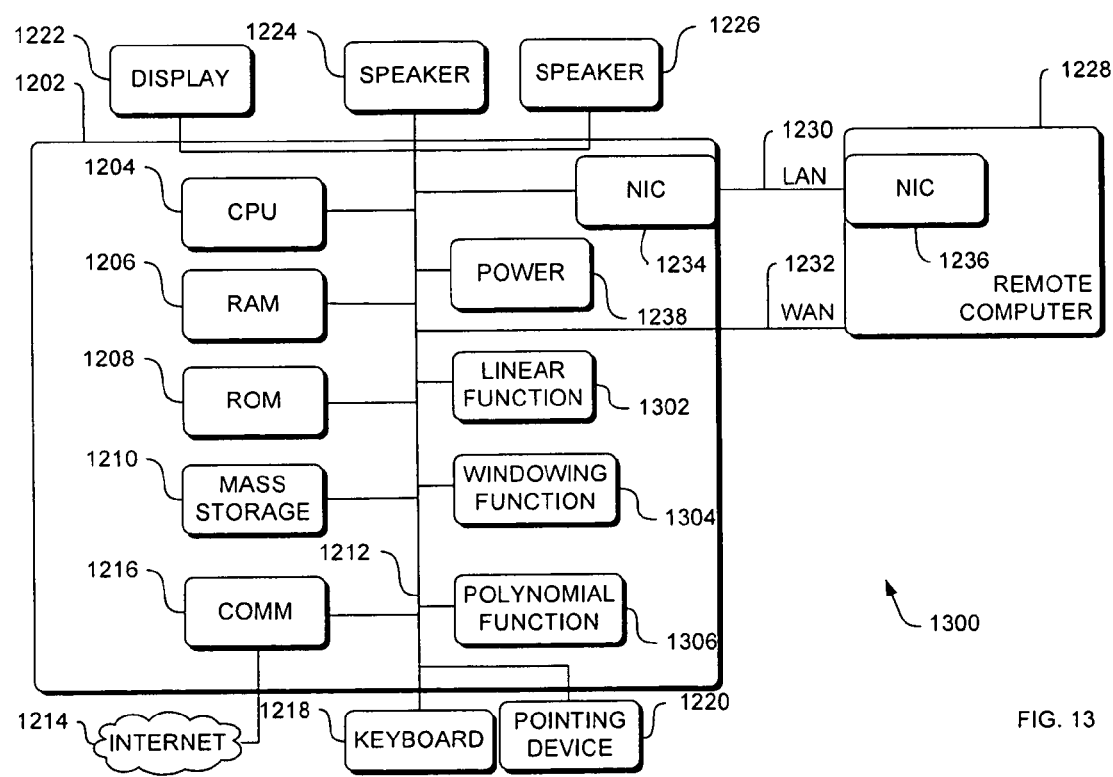
FIG. 13 is a block diagram of the hardware and operating embodiment having a specialized filter.

FIG. 13 is a block diagram of the hardware and operating embodiment 1300 having a specialized filter. Computer 1202 includes a linear function component 1302 that implements the linear function of action 302 in FIG. 3. Computer 1202 also includes a windowing function component 1304 that implements the windowing function of action 304 in FIG. 3. Computer 1202 further includes a polynomial function component 1306 that implements the polynomial function of action 306 in FIG. 3.

Components 1240, 1242 and 1244 and components that implement methods 100-300 and 700-900 can be embodied as computer hardware circuitry or as a computer-accessible program, or a combination of both. In another embodiment, the components are implemented in an application service provider (ASP) system.

More specifically, in the computer-accessible program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 1202 in FIG. 12, or on at least as many computers as there are components.

CONCLUSION

Systems, methods and apparatus that generate a 3D image from 2D tomosynthesis images using a specialized filter has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural design terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all image and communication environments and alternate technologies which provide the same functionality as described herein.

We claim:

1. A method comprising:
    acquiring a plurality of two-dimensional X-ray images of an object from a tomosynthesis system;
    filtering the plurality of two-dimensional X-ray images of the object with a filter comprising a linear ramp function and a windowing function;
    back-projecting the plurality of filtered two-dimensional X-ray images into at least one reconstructed three-dimensional image of the object; and
    iteratively updating the reconstructed three dimensional image of the object.

2. The method of claim 1, wherein the filtering further comprises filtering performed in one dimension.

3. The method of claim 1, wherein the filtering further comprises filtering performed in two dimensions.

4. The method of claim 1, wherein the linear ramp function is performed before the windowing function and a polynomial function.

5. The method of claim 1, wherein the linear ramp function is performed before a polynomial function.

6. The method of claim 1, wherein the linear ramp function further comprises a Ram-Lak filter.

7. The method of claim 1, wherein the linear ramp function further comprises a Shepp-Logan filter.

8. The method of claim 1, wherein the windowing function farther comprises a Hanning filter.

9. The method of claim 1 further comprising: before the filtering:
    preprocessing the plurality of the two-dimensional images of the object;
    segmenting each of the plurality of the preprocessed two-dimensional images of the object; and
    compensating the segmented two-dimensional images of the object.

10. The method of claim 1 further comprising: after the back-projecting:
    outputting the reconstructed three dimensional image of the object.

11. A system comprising:
    apparatus operable to acquire a plurality of two-dimensional X-ray images of an object from a tomosynthesis system;
    apparatus operable to filter the plurality of two-dimensional X-ray images of the object with a filter comprising a linear ramp function and a windowing function;
    apparatus operable to back-project the plurality of filtered two-dimensional X-ray images into at least one reconstructed three-dimensional image of the object; and
    apparatus operable to iteratively update the at least one reconstructed three-dimensional image of the object.

12. The system of claim 11 further comprising:
    apparatus operable to preprocess the plurality of the two-dimensional X-ray images of the object;
    apparatus operable to segment each of the plurality of the preprocessed two-dimensional X-ray images of the object; and apparatus operable to compensate the segmented two-dimensional X-ray images of the object.

13. The system of claim 11 further comprising:
apparatus operable to apply constraints to the filtered two-dimensional images of the object.

14. The system of claim 11 further comprising:
apparatus operable to filter the plurality of two-dimensional X-ray images of the object from a polynomial function of the two-dimensional X-ray images; and
apparatus operable to output the reconstructed three-dimensional image of the object.

15. The system of claim 11 further comprising:
apparatus operable to digital detection of X-ray radiation.

16. The system of claim 11 further comprising:
apparatus operable to preprocess the plurality of the two-dimensional X-ray images of the object;
apparatus operable to segment each of the plurality of the preprocessed two-dimensional X-ray images of the object;
apparatus operable to compensate the segmented two-dimensional X-ray images of the object;
apparatus operable to apply constraints to the filtered two-dimensional images of the object;
apparatus operable to filter the plurality of two-dimensional X-ray images of the object from a polynomial function of the two-dimensional X-ray images;
apparatus operable to output the reconstructed three-dimensional image of the object; and
apparatus operable to iteratively update the reconstructed three-dimensional image of the object.

17. A device comprising:
apparatus operable to acquire a plurality of two-dimensional X-ray images of an object from a tomosynthesis system;
apparatus operable to filter the plurality of two-dimensional X-ray images of the object with a filter comprising a linear ramp function and a windowing function
apparatus operable to back-project the plurality of filtered two-dimensional X-ray images into at least one reconstructed three-dimensional image of the object;
apparatus operable to iteratively update the at least on reconstructed three-dimensional image of the object.

18. The device of claim 17 further comprising:
apparatus operable to preprocess the plurality of the two-dimensional X-ray images of the object;
apparatus operable to segment each of the plurality of the two-dimensional X-ray images of the object; and
apparatus operable to compensate the segmented two-dimensional X-ray images of the object.

19. The device of claim 17 further comprising:
apparatus operable to apply constraints to the filtered two-dimensional images of the object.

20. The device of claim 17 further comprising:
apparatus operable to filter the plurality of two-dimensional X-ray images of the object from a polynomial function of the two-dimensional X-ray images; and
apparatus operable to display the at least one reconstructed three-dimensional image of the object.

* * * * *